(12) United States Patent
Yan et al.

(10) Patent No.: US 11,067,752 B2
(45) Date of Patent: *Jul. 20, 2021

(54) RECONFIGURABLE OPTICAL ADD/DROP MULTIPLEXER

(71) Applicant: Huawei Technologies Co., Ltd., Shenzhen (CN)

(72) Inventors: Yunfei Yan, Dongguan (CN); Zhiyong Feng, Dongguan (CN); Han Zhao, Dongguan (CN); Liangjia Zong, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/836,488

(22) Filed: Mar. 31, 2020

(65) Prior Publication Data

US 2020/0225417 A1 Jul. 16, 2020

Related U.S. Application Data

(63) Continuation of application No. 15/988,760, filed on May 24, 2018, now Pat. No. 10,620,376, which is a (Continued)

(51) Int. Cl.
*G02B 6/293* (2006.01)
*G02B 6/35* (2006.01)
*H04J 14/02* (2006.01)

(52) U.S. Cl.
CPC .......... *G02B 6/29383* (2013.01); *G02B 6/35* (2013.01); *G02B 6/3518* (2013.01);
(Continued)

(58) Field of Classification Search
None
See application file for complete search history.

(56) References Cited

U.S. PATENT DOCUMENTS

| 9,008,514 B2 | 4/2015 | Boduch et al. |
| 2015/0215066 A1 | 7/2015 | Testa et al. |
| | (Continued) | |

FOREIGN PATENT DOCUMENTS

| CN | 101141224 A | 3/2008 |
| CN | 102833031 A | 12/2012 |
| | (Continued) | |

OTHER PUBLICATIONS

U.S. Appl. No. 15/988,760, filed May 24, 2018, Patented.

*Primary Examiner* — Chad H Smith
(74) *Attorney, Agent, or Firm* — Leydig, Voit & Mayer, Ltd.

(57) ABSTRACT

Embodiments of the present invention provide a reconfigurable optical add/drop multiplexer, including: an input component, an output component, a beamsplitter, a first switch array, a wavelength dispersion system, a redirection system, and a second switch array. The input component includes M+P input ports, the output component includes N output ports, the beamsplitter is configured to: receive M input beams from M input ports, and split each of the M input beams into at least N parts, to obtain at least M×N beams; the first switch array includes at least P switch units; and the second switch array includes N rows of switch units. The first switch array, the beamsplitter, the wavelength dispersion system, the redirection system, and the second switch array are arranged so that P optical add beams and sub-beams of M×N beams in the at least M×N beams can be routed to the N output ports.

13 Claims, 9 Drawing Sheets

Related U.S. Application Data continuation of application No. PCT/CN2015/095491, filed on Nov. 25, 2015.

(52) U.S. Cl.
CPC ........ *G02B 6/3546* (2013.01); *H04J 14/0212* (2013.01); *G02B 6/29311* (2013.01)

(56) References Cited

U.S. PATENT DOCUMENTS

| | | | |
|---|---|---|---|
| 2015/0277052 A1* | 10/2015 | Keyworth | G02B 6/272 385/17 |
| 2016/0105242 A1 | 4/2016 | Wang et al. | |
| 2017/0041689 A1 | 2/2017 | Yan et al. | |

FOREIGN PATENT DOCUMENTS

| | | |
|---|---|---|
| CN | 102868476 A | 1/2013 |
| CN | 103023599 A | 4/2013 |
| CN | 103609041 A | 2/2014 |
| WO | 2015161452 A1 | 10/2015 |

\* cited by examiner

RECONFIGURABLE OPTICAL ADD/DROP MULTIPLEXER

CROSS-REFERENCE TO RELATED APPLICATIONS

This application is a continuation of U.S. patent application Ser. No. 15/988,760, filed on May 24, 2018, which is a continuation of International Application No. PCT/CN2015/095491, filed on Nov. 25, 2015. All of the aforementioned patent applications are hereby incorporated by reference in their entireties.

TECHNICAL FIELD

Embodiments of the present invention relates to the field of optical communication, and in particular, to a reconfigurable optical add/drop multiplexer in the field of optical communication.

BACKGROUND

As information technologies develop, complexity of an optical communications network constantly increases. A large quantity of wavelength division multiplexing (WDM) beams from different dimensions (directions/lines) need to be switched to different dimensions (that is, inter-dimension switching) on a common optical network node (for example, a backbone node in a metropolitan area network) of a plurality of tangent ring networks. In addition, the optical network node has optical add and optical drop lines connected to a convergence layer. The optical add line is used to switch, to a target dimension, a beam converged from a lower layer to the optical network node. The optical drop line is used to switch, to the optical network node, a beam that is in another dimension and that needs to be used for communication with the optical network node. Currently, network traffic keeps increasing, an optical network node has increasingly more throughputs, and one optical network node needs to process local optical add/drop services while processing beam switching in more dimensions.

In the prior art, operators may use a reconfigurable optical add/drop multiplexer (ROADM) on an optical network node to perform dimension switching, optical add or optical drop services, and the like. Currently, there are ROADMs of a plurality of structures, for implementing cross-connections and connections between optical network nodes. For example, there is an N×M ROADM, and the N×M ROADM includes M input ports, N output ports, and two levels of switch arrays. The M input ports are configured to input WDM beams, and a first-level switch array includes M×K (M rows and K columns) switch units, configured to perform optical path processing on sub-beams of the WDM beams, so that the processed sub-beams are transmitted to switch units in a second-level switch array. The second-level switch array includes N switch units arranged in a two-dimensional manner, and the switch units are configured to output, to the N output ports, the sub-beams processed by the first-level switch array. Because the switch units in the second-level switch array are arranged in a two-dimensional manner, the N×M ROADM can implement more output ports. However, because a configured structure and an optical path design are limited, the N×M ROADM can implement only an optical drop function. If both an optical add/drop function and an inter-dimension switching function need to be implemented, the N×M ROADM needs to be combined with another optical component. Therefore, requirements such as a high integration level, a high cross-connection capability, and low costs of an optical network cannot be met in terms of a scale, a volume, and costs.

An ROADM that can not only implement high-level integration, but also improve an cross-connection capability of an optical network node is urgently needed.

SUMMARY

Embodiments of the present invention provide a reconfigurable optical add/drop multiplexer, to implement a local optical add function and an inter-dimension switching function in a single optical system, and improve an integration level of the reconfigurable optical add/drop multiplexer.

According to a first aspect, an embodiment of the present invention provides a reconfigurable optical add/drop multiplexer, including: an input component including M+P input ports, where M input ports are used for dimensional input, P input ports are used for wavelength adding, and M and P are integers greater than or equal to 1; an output component including N output ports, where the N output ports are used for dimensional output, and N is an integer greater than or equal to 1; a first switch array including at least P switch units, where each of the P input ports is corresponding to at least one of the at least P switch units, and the at least P switch units are configured to: receive P input beams from the P input ports, and route the P input beams; a beamsplitter, configured to: receive M input beams from the M input ports, and split each of the M input beams into at least N parts, to obtain at least M×N beams; a wavelength dispersion system, configured to: receive the P input beams from the first switch array, and disperse the P input beams, to obtain sub-beams of the P input beams, and further configured to: receive the at least M×N beams from the beamsplitter, and disperse the at least M×N beams, to obtain sub-beams of the at least M×N beams; a second switch array including N rows of switch units, where each row of switch units include K switch units, the K switch units are in a one-to-one correspondence with K wavelengths, the K switch units are separately configured to route sub-beams of respective wavelengths of the K switch units, and K is an integer greater than 1; and a redirection system, configured to: receive the sub-beams of the P input beams from the wavelength dispersion system, and redirect the sub-beams of the P input beams to the N rows of switch units in the second switch array, where the N rows of switch units route the sub-beams of the P input beams to the N output ports, and the first switch array, the second switch array, the wavelength dispersion system, and the redirection system are arranged so that the sub-beams of the P input beams can be routed to the N output ports, where the redirection system is further configured to: receive sub-beams of M×N beams in the at least M×N beams from the wavelength dispersion system, and redirect the sub-beams of the M×N beams to the N rows of switch units in the second switch array, where the N rows of switch units route the sub-beams of the M×N beams to the N output ports, and the beamsplitter, the second switch array, the wavelength dispersion system, and the redirection system are arranged so that the sub-beams of the M×N beams can be routed to the N output ports.

With reference to the first aspect, in a first possible implementation of the first aspect, the reconfigurable optical add/drop multiplexer further includes a third switch array including at least Q switch units, where each of the at least Q output ports is corresponding to at least one of the at least Q switch units; the input component further includes Q output ports, where the Q output ports are used for wavelength dropping, and Q is an integer greater than 1; the at least N parts are N+1 parts, and the at least M×N beams are M×(N+1) beams; the second switch array further includes J rows of switch units, where J is an integer greater than or equal to 1 and less than or equal to M; and the redirection system is further configured to: receive, from the wavelength dispersion system, sub-beams of remaining M beams in the M×(N+1) beams except the M×N beams, and redirect the sub-beams of the M beams to the J rows of switch units in the second switch array, where the J rows of switch units route the sub-beams of the M beams to the at least Q switch units in the third switch array, the at least Q switch units separately output, to the corresponding Q output ports, the beams received from the J rows of switch units, and the second switch array, the third switch array, the wavelength dispersion system, and the redirection system are arranged so that the sub-beams of the M beams can be routed to the Q output ports.

With reference to the first possible implementation of the first aspect, in a second possible implementation of the first aspect, J=M, the J rows of switch units in the second switch array are in a one-to-one correspondence with the M input ports, and each row of switch units in the J rows of switch units in the second switch array are configured to route sub-beams obtained after input beams of an input port corresponding to the row of switch units pass through the wavelength dispersion system.

With reference to the first aspect, or the first or the second possible implementation of the first aspect, in a third possible implementation of the first aspect, the N rows of switch units in the second switch array are in a one-to-one correspondence with the N output ports, and each switch unit in each of the N rows of switch units in the second switch array is configured to: select one target sub-beam from a plurality of sub-beams transmitted to the switch unit, and route the target sub-beam to an output port corresponding to the row of switch units.

With reference to the first aspect, or the first to the third possible implementations of the first aspect, in a fourth possible implementation of the first aspect, the redirection system includes a first redirection subsystem, where the first redirection subsystem is configured to change beam propagation characteristics of the sub-beams of the P input beams and the sub-beams of the at least M×N beams in a sub-wavelength extension plane direction, so that sub-beams that are in the sub-beams of the P input beams and the sub-beams of the at least M×N beams and that have a same wavelength are routed in the sub-wavelength extension plane direction to a same location in the second switch array; and the redirection system further includes a second redirection subsystem, where the second redirection subsystem is configured to change beam propagation characteristics of the sub-beams of the P input beams and the sub-beams of the M×N beams in a port switching plane direction, so that sub-beams that are in the sub-beams of the P input beams and the sub-beams of the M×N beams and that are corresponding to a same output port are routed in the port switching plane direction to a same location in the second switch array.

With reference to the first or the second possible implementation of the first aspect, in a fifth possible implementation of the first aspect, the redirection system includes a third redirection subsystem, and the third redirection subsystem is configured to change beam propagation characteristics of the sub-beams of the remaining M beams in the port switching plane direction, so that sub-beams, in the sub-beams of the remaining M beams, of beams that are input from a same input port are routed in the port switching plane direction to a same location in the second switch array.

With reference to any one of the first aspect, or the first to the fifth possible implementations of the first aspect, in a sixth possible implementation of the first aspect, the beamsplitter is one of a liquid crystal on silicon LCOS, a spatial beamsplitter, or a planar waveguide beamsplitter.

With reference to any one of the first aspect, or the first to the sixth possible implementations of the first aspect, in a seventh possible implementation of the first aspect, the first switch array and the second switch array are one or more of micro-electro-mechanical systems MEMS, an LCOS, or a planar waveguide switch array.

With reference to any one of the first aspect, or the first to the seventh possible implementations of the first aspect, in an eighth possible implementation of the first aspect, K is a maximum quantity of sub-wavelengths of wavelength division multiplexing signals that are input by using the M+P input ports.

With reference to any one of the first aspect, or the first to the eighth possible implementations of the first aspect, in a ninth possible implementation of the first aspect, the wavelength dispersion system includes at least one grating.

With reference to any one of the first aspect, or the first to the ninth possible implementations of the first aspect, in a tenth possible implementation of the first aspect, the redirection system includes at least one lens.

With reference to any one of the first aspect, or the first to the tenth possible implementations of the first aspect, in an eleventh possible implementation of the first aspect, the reconfigurable optical add/drop multiplexer further includes: an input port collimator array including M+P collimators, where the M+P collimators are corresponding to the M+P input ports, and are configured to convert, into collimated beams, beams that are input by using the M+P input ports; and an output port collimator array including N collimators, where the N collimators are corresponding to the N output ports, and are configured to convert, into collimated beams, beams that are to be output at the N output ports.

In the embodiments of the present invention, the beamsplitter is disposed in the reconfigurable optical add/drop multiplexer, each of the M input beams received by using the M input ports is split into at least N parts by using the beamsplitter, and N parts of beams in the at least N parts of beams are used for inter-dimension switching. In addition, all the components in the reconfigurable optical add/drop multiplexer are arranged so that arrangement of the first switch array, the wavelength dispersion system, the redirection system, and the second switch array can implement an optical add function, and arrangement of the beamsplitter, the wavelength dispersion system, and the second switch array can implement an inter-dimension switching function. Therefore, the beamsplitter is disposed, and an optical switching function of the second switch array is repeatedly used, so that the local optical add function and the inter-dimension switching function are implemented in a single optical system by using the two levels of switch arrays. This can improve an integration level of the reconfigurable optical add/drop multiplexer.

BRIEF DESCRIPTION OF DRAWINGS

To describe the technical solutions in the embodiments of the present invention more clearly, the following briefly describes the accompanying drawings required for describing the embodiments. Apparently, the accompanying draw

DESCRIPTION OF EMBODIMENTS

Figure 1:
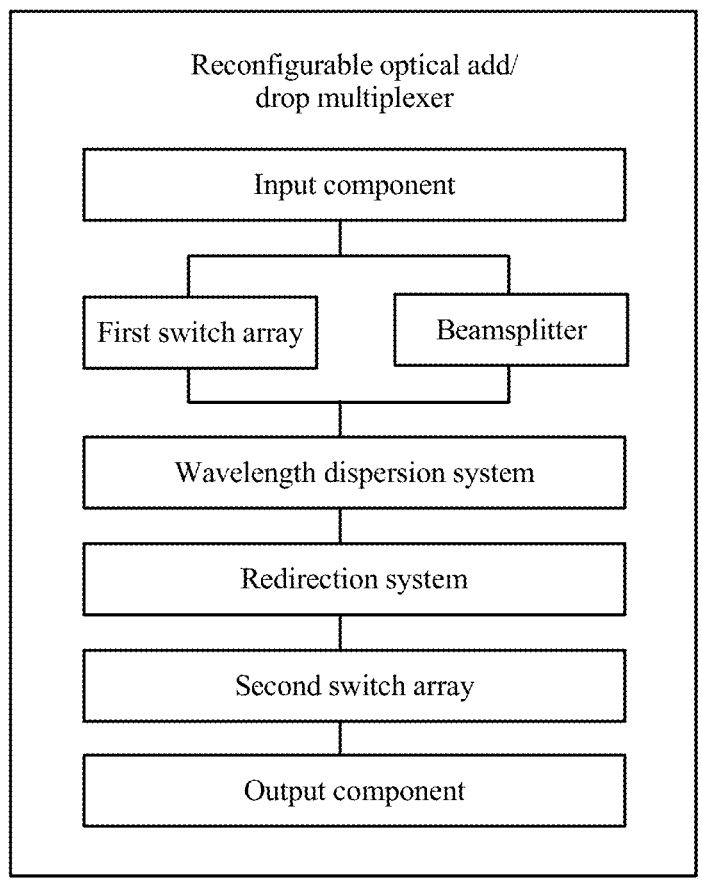
- FIG. 1 is a schematic block diagram of a reconfigurable optical add/drop multiplexer according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems that can use a beam (in other words, a signal beam) to perform data transmission, such as: a Global System for Mobile Communications (GSM), a Code Division Multiple Access (CDMA) system, a Wideband Code Division Multiple Access (WCDMA) system, a general packet radio service (GPRS) system, and a Long Term Evolution (LTE) system.

In the prior art, a reconfigurable optical add/drop multiplexer may be used on an optical network node to implement reconfiguration of an optical network node service. The optical network node service may include functions such as inter-dimension switching, wavelength adding, and wavelength dropping. The optical network node service may be implemented by remotely configuring the reconfigurable optical add/drop multiplexer (ROADM) by using a network management system.

Currently, there are a plurality of types of ROADMs that are of different structures or that are used to implement different functions. For example, there is a first N×M ROADM, and the first N×M ROADM includes M input ports, N output ports, and two levels of switch arrays. The M input ports are configured to: input wavelength division multiplexing (WDM) beams, and disperse the WDM beams into K sub-beams of different wavelengths by using a grating. A first-level switch array includes M×K switch units, configured to switch, to different switch units in a second-level switch array, sub-beams that pass through a grating (that is, "demultiplexing"). The second-level switch array includes N switch units, configured to change beam propagation characteristics of all sub-beams, to recombine all the sub-beams (that is, "multiplexing"). Sub-beams from the second-level switch array that have different wavelengths and that are corresponding to a same output port are combined into a WDM signal by using the grating, and the WDM signal is output to the N output ports. To adapt to efficiency and flexibility requirements in high-speed optical communication, the ROADM that serves as a core of network cross-connection and connections needs to continuously develop. The ROADM is expected to have more input ports (including input ports used for dimensional input and input ports for wavelength adding) and output ports (including output ports used for dimensional output and output ports used for wavelength dropping). Because a quantity K (which is specifically a quantity of wavelengths of included sub-beams) of sub-beams included in a WDM beam is relatively large and fixed, a quantity of input ports in the first N×M ROADM mainly depends on M, and a quantity of output ports mainly depends on N. However, because configured space and an cross-connection capability (for example, a rotation range) of a single switch unit are limited, M and N cannot take large values. Therefore, quantities of output/input ports are limited, and increasing network demands and user's requirements cannot be met.

For another example, there is a second N×M ROADM, and the second N×M ROADM includes M input ports, N output ports, and two levels of switch arrays. The M input ports are configured to input WDM beams, and a first-level switch array includes M×K (M rows and K columns) switch units, configured to perform optical path processing on sub-beams of the WDM beams, so that the processed sub-beams are transmitted to switch units in a second-level switch array. The second-level switch array includes N switch units arranged in a two-dimensional manner, configured to output, to the N output ports, the sub-beams processed by the first-level switch array. Because the switch units in the second-level switch array are arranged in a two-dimensional manner, the second N×M ROADM can implement more output ports than the first N×M ROADM. However, because a configured structure and an optical path design are limited, the second N×M ROADM can implement only a "demultiplexing" function of the first N×M ROADM, in other words, the second N×M ROADM can implement only an optical drop function. If both an optical add/drop function and an inter-dimension switching function need to be implemented, the N×M ROADM needs to be combined with another optical component. Therefore, requirements such as a high integration level, a high cross-connection capability, and low costs of an optical network cannot be met in terms of a scale, a volume, and costs.

For another example, there is a third N×M ROADM, and the third N×M ROADM is equivalent to an image structure of the second N×M ROADM. Specifically, the third N×M ROADM includes M input ports, N output ports, and two levels of switch arrays. A first-level switch array includes M switch units arranged in a two-dimensional manner, configured to transmit beams received from the M input ports to switch units in a second-level switch array. The second-level switch array includes N×K switch units, configured to: recombine the beams, and transmit a combined beam to the N output ports. Because the switch units in the first switch array are distributed in a two-dimensional manner, the third N×M ROADM can implement more input ports than the first N×M ROADM. However, because a configured structure and an optical path design are limited, the third N×M ROADM can implement only a "multiplexing" function of the first N×M ROADM, in other words, the third N×M ROADM can implement only an optical add function.

Optionally, the second N×M ROADM and the second N×M ROADM may be cascaded. The second N×M ROADM includes N input ports, configured to input dimensional WDM beams, and further includes N×N+M output ports, where N×N ports are configured to output WDM beams, and M output ports are configured to output optical drop signals. The third N×M ROADM may include N×N+M input ports, where N×N input ports are configured to receive the WDM beams output by the second N×M ROADM, and M input ports are configured to receive optical add signals. Beams that are input in all dimensions are split into N+M parts, where N parts of WDM beams are used for output in different dimensions, and the other M parts are used for wavelength dropping. A local optical add/drop function and an inter-dimension switching function can be implemented by using two modules. However, in the embodiments of the present invention, two optical modules and four levels of optical switch arrays are used to implement various network cross-connection functions. As an optical communications network rapidly develops, an ROADM that has a higher integration level, more functions, and a smaller volume, and lower costs is urgently needed.

FIG. 1 shows an example structure of a reconfigurable optical add/drop multiplexer according to an embodiment of the present invention. As shown in FIG. 1, the reconfigurable optical add/drop multiplexer includes:

an input component including M+P input ports, where M input ports are used for dimensional input, P input ports are used for wavelength adding, and M and P are integers greater than or equal to 1;

an output component including N output ports, where the N output ports are used for dimensional output, and N is an integer greater than or equal to 1;

a first switch array including at least P switch units, where each of the P input ports is corresponding to at least one of the at least P switch units, and the at least P switch units are configured to: receive P input beams from the P input ports, and route the P input beams;

a beamsplitter, configured to: receive M input beams from the M input ports, and split each of the M input beams into at least N parts, to obtain at least M×N beams;

a wavelength dispersion system, configured to: receive the P input beams from the first switch array, and disperse the P input beams, to obtain sub-beams of the P input beams, and further configured to: receive the at least M×N beams from the beamsplitter, and disperse the at least M×N beams, to obtain sub-beams of the at least M×N beams;

a second switch array including N rows of switch units, where each row of switch units include K switch units, the K switch units are in a one-to-one correspondence with K wavelengths, the K switch units are separately configured to route sub-beams of respective wavelengths of the K switch units, and K is an integer greater than 1; and a redirection system, configured to: receive the sub-beams of the P input beams from the wavelength dispersion system, and redirect the sub-beams of the P input beams to the N rows of switch units in the second switch array, where the N rows of switch units route the sub-beams of the P input beams to the N output ports, and the first switch array, the second switch array, the wavelength dispersion system, and the redirection system are arranged so that the sub-beams of the P input beams can be routed to the N output ports.

The redirection system is further configured to: receive sub-beams of M×N beams in the at least M×N beams from the wavelength dispersion system, and redirect the sub-beams of the M×N beams to the N rows of switch units in the second switch array, where the N rows of switch units route the sub-beams of the M×N beams to the N output ports, and the beamsplitter, the second switch array, the wavelength dispersion system, and the redirection system are arranged so that the sub-beams of the M×N beams can be routed to the N output ports.

In this embodiment of the present invention, the beamsplitter is disposed in the reconfigurable optical add/drop multiplexer, each of the M input beams received by using the M input ports is split into at least N parts by using the beamsplitter, and N parts of beams in the at least N parts of beams are used for inter-dimension switching. In addition, all the components in the reconfigurable optical add/drop multiplexer are arranged so that arrangement of the first switch array, the wavelength dispersion system, the redirection system, and the second switch array can implement an optical add function, and arrangement of the beamsplitter, the wavelength dispersion system, and the second switch array can implement an inter-dimension switching function. Therefore, the beamsplitter is disposed, and an optical switching function of the second switch array is repeatedly used, so that the local optical add function and the inter-dimension switching function are implemented in a single optical system by using the two levels of switch arrays. This can improve an integration level of the reconfigurable optical add/drop multiplexer.

Optionally, in an embodiment, the reconfigurable optical add/drop multiplexer in this embodiment of the present invention may further include a third switch array including at least Q switch units, where each of the at least Q output ports is corresponding to at least one of the at least Q switch units.

The input component further includes Q output ports, where the Q output ports are used for wavelength dropping, and Q is an integer greater than 1.

The at least N parts are N+1 parts, and the at least M×N beams are M×(N+1) beams.

The second switch array further includes J rows of switch units, where J is an integer greater than or equal to 1 and less than or equal to M.

The redirection system is further configured to: receive, from the wavelength dispersion system, sub-beams of remaining M beams in the M×(N+1) beams except the M×N beams, and redirect the sub-beams of the M beams to the J rows of switch units in the second switch array, where the J rows of switch units route the sub-beams of the M beams to the at least Q switch units in the third switch array, the at least Q switch units separately output, to the corresponding Q output ports, the beams received from the J rows of switch units, and the second switch array, the third switch array, the wavelength dispersion system, and the redirection system are arranged so that the sub-beams of the M beams can be routed to the Q output ports.

In this embodiment of the present invention, the third switch array is added, each of the M input beams received by using the M input ports is split into N+1 parts by using the beamsplitter, N parts of beams are used for inter-dimension switching, and remaining one part of beams is used for local wavelength dropping. In addition, all the components in the reconfigurable optical add/drop multiplexer are arranged so that arrangement of the first switch array, the wavelength dispersion system, the redirection system, and the second switch array can implement the optical add function, and arrangement of the beamsplitter, the wavelength dispersion system, the second switch array, and the third switch array can implement both a local optical drop function and the inter-dimension switching function. Therefore, the beamsplitter is disposed, and the optical switching function of the second switch array is repeatedly used, so that the local optical add function, the local optical drop function, and the inter-dimension switching function are implemented in a single optical system by using the three levels of switch arrays. This can improve an integration level of the reconfigurable optical add/drop multiplexer.

First, the following describes functions and structures of all the components of the reconfigurable optical add/drop multiplexer.

A1. Input Component

In this embodiment of the present invention, input ports may be arranged in a one-dimensional manner, or may be arranged in a two-dimensional manner. The M input ports are configured to obtain beams in M dimensions. The beams in the M dimensions may be wavelength division multiplexing (WDM) beams. One WDM beam may include a plurality of (at least two) sub-beams, and center wavelengths of all the sub-beams (in other words, center frequencies of all the sub-beams) are different from each other. The beams in the M dimensions may be beams from different foreign communications nodes (for example, a previous-hop communications node in a communication link). In addition, the P input ports are configured to obtain local optical add beams, and the optical add beams may be single-wavelength beams, or may be WDM beams. The optical add beams may be beams sent to a foreign communications node, or may be beams sent to a local communications node. This is not particularly limited in the present invention.

In addition, the foregoing dimensions may be classified according to a type quantity of sources of the dimensions in a preset rule (in other words, a quantity of fibers to which the reconfigurable optical add/drop multiplexer is connected). The preset rule may be region-based classification, for example, city-based, province-based, or country-based classification, or may be entity-based classification, for example, one communications node is one dimension, or one group of communications nodes is one dimension.

It should be understood that the dimension classification manners enumerated above are merely examples, and the present invention is not particularly limited thereto. Other classification methods that can be used to distinguish between communications nodes fall within the protection scope of the present invention.

Optionally, in this embodiment of the present invention, the input component may further include an input optical fiber array and an input port collimator array.

The input optical fiber array may include M+P input fibers arranged in a one-dimensional or two-dimensional manner, where M input fibers are configured to obtain beams from all dimensions, and remaining P fibers are configured to obtain optical add beams.

The input port collimator array may include M+P collimators arranged in a one-dimensional or two-dimensional manner, where the M+P collimators are corresponding to the M+P input ports, and are configured to convert, into collimated beams, beams that are input by using the M+P input ports. The M+P collimators are in a one-to-one correspondence with the M+P input fibers, and a collimator is configured to collimate a beam that is output from a corresponding input fiber, in other words, converting, into a parallel beam, a beam that is input by using the input fiber, and enlarging a beam waist value at the same time, to facilitate performing subsequent optical path processing.

A2. Wavelength Dispersion System

In this embodiment of the present invention, the wavelength dispersion system may disperse a beam into sub-beams of different wavelengths (in other words, center frequencies) on a sub-wavelength switching plane (in other words, a top-view plane) in a diffraction manner, so that the sub-beams that are output from the wavelength dispersion system are dispersed in a sub-wavelength switching plane direction in a radiation manner.

Optionally, in this embodiment of the present invention, the wavelength dispersion system may be further configured to combine, into a WDM beam, sub-beams that are in sub-beams emerging from the second switch array and whose targets are a same output port, and may transmit the WDM beam to a corresponding output port by using the redirection system.

Optionally, the wavelength dispersion system is at least one grating.

For example, the wavelength dispersion system may be an array waveguide grating, a reflection grating, a transmittance grating, a dispersion prism, or a planar waveguide grating. In addition, to increase a dispersion effect, a combination of a plurality of gratings may be used, or an optical path may be adjusted so that a beam passes through a same grating a plurality of times.

A3. Beamsplitter

In this embodiment of the present invention, the beamsplitter is configured to split each of the foregoing M input beams received by using the M input ports into at least N parts, in other words, broadcasting each beam as at least N parts, or making at least N copies of each beam. A quantity of sub-beams included in each of the at least N beams is the same as a quantity of sub-beams included in an original input beam before beam splitting, and at least N groups (each group includes M beams) of beams, in other words, at least M×N beams are finally obtained. In the at least N groups, N groups of beams (in other words, M×N beams) may be used for inter-dimension switching. For example, the at least N groups may be N groups, and the N groups may be used for inter-dimension switching. In this case, a local optical drop function cannot be implemented. For another example, the at least N groups may be N+1 groups, N groups of beams may be used for inter-dimension switching, and remaining one group of beams (in other words, M×1 beams) may be used for local wavelength dropping. Optionally, the beamsplitter may be one of an LCOS, a spatial beamsplitter, or a planar waveguide beamsplitter.

Figure 2:
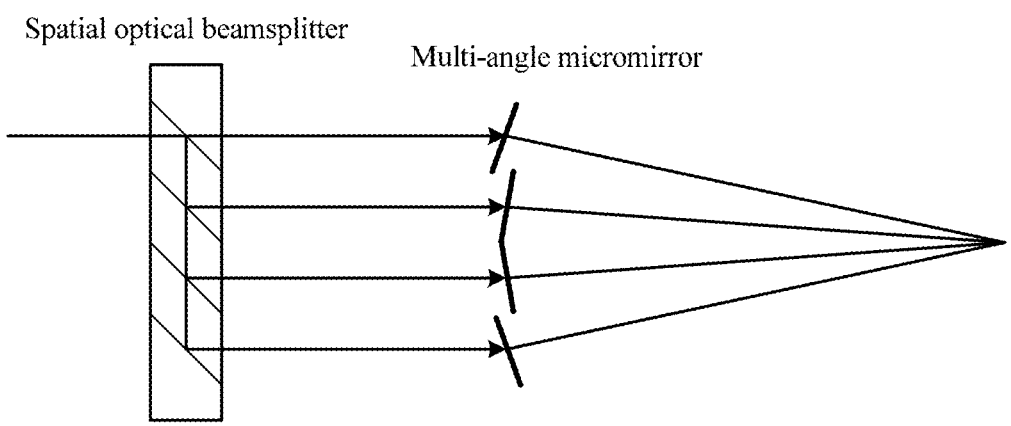
FIG. 2 is a schematic diagram of a beamsplitter according to another embodiment of the present invention.
Figure 3:
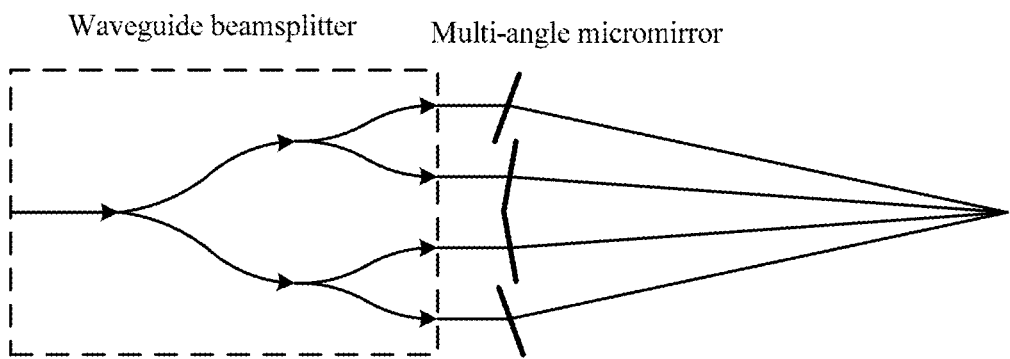
FIG. 3 is a schematic diagram of a beamsplitter according to still another embodiment of the present invention.

By way of example, and not limitation, FIG. 2 and FIG. 3 each are schematic diagrams of two types of beamsplitters according to an embodiment of the present invention. The beamsplitter may use a combination of a spatial optical beamsplitter and a multi-angle micromirror shown in FIG. 2. Alternatively, the beamsplitter may use a combination of a waveguide beamsplitter and a multi-angle micromirror shown in FIG. 3. Alternatively, another device having a beam splitting function is used, and this embodiment of the present invention is not limited thereto.

It should be understood that in this embodiment of the present invention, the beamsplitter makes at least N copies of each dimensionally input beam, and transmits N of the at least N copies to a subsequent optical path for inter-dimension switching. Therefore, the reconfigurable optical add/drop multiplexer in this embodiment of the present invention has a broadcast function.

A4. First Switch Array

In this embodiment of the present invention, the first switch array may include the at least P switch units that are arranged in a one-dimensional or two-dimensional manner. Each input port in P input ports used for wavelength adding is corresponding to at least one switch unit in the at least P switch units. For example, when the at least P switch units are P switch units, the at least P switch units are in a one-to-one correspondence with the P input ports used for wavelength adding. The at least P switch units are configured to route P optical add beams, so that the P optical add beams can be transmitted to the N rows of switch units in the second switch array after being processed by the redirection system. In this embodiment of the present invention, no limitation is imposed on a specific manner in which the first switch array performs routing. For example, the first switch array may change beam propagation characteristics (for example, an angle at which the beams emerge) of the P optical add beams according to target dimensional output ports of the P beams, so that the P beams are transmitted to the N rows of switch units in the second switch array through a specific optical path.

A5. Redirection System

In this embodiment of the present invention, the redirection system may perform redirection processing on sub-beams of the foregoing P input beams, and redirect the sub-beams to the N rows of switch units in the second switch array. The P input beams may be optical add beams, and the N rows of switch units may be corresponding to N output ports used for dimensional output. The sub-beams of the P input beams each are corresponding to one of the N output ports, and the port is used as a target output port for wavelength adding of the sub-beam. The redirection system may route each sub-beam to a switch unit, in the second switch array, corresponding to the target output port by changing a beam propagation path of each beam.

Specifically, the redirection system may be further configured to perform redirection processing on the sub-beams, of the at least M×N beams, received from the wavelength dispersion system. The M×N beams in the at least M×N beams may be used for inter-dimension switching, that is, the sub-beams of the M×N beams may be used for inter-dimension output. The redirection system may be configured to redirect the sub-beams of the M×N beams to the N rows of switch units in the second switch array.

As described above, the N rows of switch units may be corresponding to the N output ports used for dimensional output, that is, the N rows of switch units in the second switch array are in a one-to-one correspondence with the N output ports. Each switch unit in each of the N rows of switch units in the second switch array is configured to: select one target sub-beam from a plurality of sub-beams transmitted to the switch unit, and route the target sub-beam to an output port corresponding to the row of switch units. In other words, the M×N beams are N groups of beams, each group of beams may include M beams, and sub-beams in each group of beams are routed to a corresponding row of switch units in the N rows of switch units. In other words, each row of switch units in the N rows of switch units may receive sub-beams of M beams from each dimensional input port. Then the N rows of switch units may route the sub-beams of the M×N beams to the corresponding N ports used for dimensional output.

Specifically, the at least M×N beams may be M×(N+1) beams, and the remaining M beams in the M×(N+1) beams may be used for local wavelength dropping. The redirection system is configured to redirect the sub-beams of the M beams to remaining J rows of switch units in the second switch array except the foregoing N rows of switch units. J is an integer greater than or equal to 1 and less than or equal to M. When J is less than M, the beams have a wavelength blocking characteristic during wavelength dropping, and when J=M, the beams do not have the wavelength blocking characteristic during wavelength dropping.

When J=M, it indicates that the J rows of switch units are in a one-to-one correspondence with the M input ports used for dimensional input, so that the J rows of switch units are also in a one-to-one correspondence with the M beams from the M dimensions. Each row of switch units in the J rows of switch units in the second switch array are configured to route sub-beams obtained after input beams of an input port corresponding to the row of switch units pass through the wavelength dispersion system. The J rows of switch units may separately route sub-beams in the M dimensions to the at least Q switch units in the third switch array. It should be understood that a specific rule for the J rows of switch units to route the sub-beams in the M dimensions may be: routing is based on upper-layer configuration or remote configuration, or may be another rule. This is not limited in this embodiment of the present invention.

Optionally, the redirection system includes at least one lens. For example, the redirection system may include a lens, a concave mirror, or a cylindrical lens. In addition, according to a difference between components selected as the redirection system, configuration locations of components in the reconfigurable optical add/drop multiplexer are different, in other words, in the reconfigurable optical add/drop multiplexer, beams are transmitted in different paths.

Optionally, in an embodiment, the redirection system may include a first redirection subsystem. The first redirection subsystem is configured to change beam propagation characteristics of the sub-beams of the P input beams and the sub-beams of the M×(N+1) beams in a sub-wavelength extension plane direction, so that sub-beams that are in the sub-beams of the P input beams and the sub-beams of the M×(N+1) beams and that have a same wavelength are routed in the sub-wavelength extension plane direction to a same location in the second switch array (in other words, a same column of switch units in the second switch array). Optionally, the first redirection subsystem may be one or more convex lenses or concave mirrors.

Optionally, the redirection system may further include a second redirection subsystem. The second redirection subsystem is configured to change beam propagation characteristics of the sub-beams of the P input beams and the sub-beams of the M×N beams in a port switching plane (in other words, a side-view plane) direction, so that sub-beams that are in the sub-beams of the P input beams and the sub-beams of the M×N beams and that are corresponding to a same output port are routed in the port switching plane direction to a same location in the second switch array (in other words, a same row of switch units in the second switch array). Optionally, the second redirection subsystem may be one or more convex lenses or concave mirrors.

Optionally, the redirection system may further include a third redirection subsystem. The third redirection subsystem may be configured to change beam propagation characteristics of the sub-beams of the remaining M beams in the port switching plane direction, so that sub-beams, in the sub-beams of the remaining M beams, of beams that are input from a same input port are routed on a port switching plane to a same location in the second switch array (in other words, a same row of switch units in the second switch array). For example, the second redirection subsystem and the third redirection subsystem may be implemented by using a same lens or a same group of lenses.

It should be understood that the first redirection subsystem is configured to change a propagation characteristic of a beam in a sub-wavelength plane direction, and the second redirection subsystem and the third redirection subsystem are configured to change a propagation characteristic of a beam on a port switching plane. In specific implementation, the first, the second, and the third redirection subsystems may be implemented by using a same lens or a same group of lenses. This is not specifically limited in this embodiment of the present invention.

A6. Second Switch Array

In this embodiment of the present invention, the second switch array may include the N rows of switch units. Each row of switch units in the second switch array may include K switch units, the K switch units are separately configured to process sub-beams of K wavelengths, and K may be a maximum quantity of sub-wavelengths of wavelength division multiplexing signals input by using the M+P input ports.

Optionally, each switch unit in each of the N rows of switch units in the second switch array is configured to: determine one target sub-beam from a plurality of sub-beams transmitted to the switch unit, and route the target sub-beam to an output port corresponding to the row of switch units. Specifically, the N rows of switch units in the second switch array may be in a one-to-one correspondence with the N output ports used for dimensional output. The N rows of switch units may be configured to process inter-dimensionally switched beams, and the N rows of switch units in the second switch array may be further configured to process local optical add beams. As described above, in addition to the sub-beams of the M×N beams from the M dimensions, the N rows of switch units are further configured to receive local optical add beams from the P input ports. In other words, each switch unit in the N rows of switch units may receive sub-beams of beams from the M dimensions and sub-beams of a beam from an optical add port. Each switch unit in the N rows of switch units may determine one target sub-beam from a plurality of sub-beams, and a combination of a plurality of target sub-beams determined by a plurality of switch units in each row of switch units is an output beam of a dimensional output port corresponding to the row of switch units. The redirection system and the wavelength dispersion system are arranged so that the plurality of target sub-beams are finally converged into one WDM beam, to be output from a corresponding output port.

Optionally, the second switch array may further include the J rows of switch units, and each row of switch units may also include K switch units.

Specifically, when J is less than M, each row of switch units in the J rows of switch units in the second switch array are configured to route sub-beams of a dimensional beam input from each input port. In this case, the sub-beams have a wavelength blocking characteristic, that is, sub-beams that have a same wavelength cannot be output from any optical drop output port during wavelength dropping at the same time. Smaller J indicates a severer wavelength blocking characteristic. When J=M, the sub-beams do not have the wavelength blocking characteristic, that is, sub-beams that have a same wavelength can be output from any optical drop output port during wavelength dropping at the same time.

When J=M, each row of switch units in the J rows of switch units in the second switch array are configured to route sub-beams of an input beam of an input port corresponding to the row of switch units, and each switch unit in each of the J rows of switch units is configured to route, to an output port corresponding to a first sub-beam, the first sub-beam transmitted to the switch unit. Specifically, the J rows of switch units in the second switch array may be in a one-to-one correspondence with the M input ports used for dimensional input, and the J rows of switch units may be configured to process local optical drop beams. The J rows of switch units are configured to receive the remaining M beams in the foregoing M×(N+1) beams. In other words, each row of switch units in the J rows of switch units are configured to receive sub-beams of an input beam of a dimensional input port corresponding to the row of switch units. Each switch unit in the J rows of switch units routes the received first sub-beam, so that the first sub-beam is transmitted to an optical drop output port corresponding to the first sub-beam by using the optical dispersion system and the redirection system. Therefore, a process of scheduling sub-beams input from all dimensions to local optical drop port is completed.

It should be noted that, in this embodiment of the present invention, the J rows of switch units and the N rows of switch units in the second switch array are respectively corresponding to the M dimensional input ports and the N dimensional output ports, and are irrelevant to quantities of P optical add ports and Q optical drop ports. Therefore, quantities of optical add ports and optical drop ports in this embodiment of the present invention are not limited by a scale of the second switch array, so that the quantities of optical add ports and optical drop ports in this embodiment of the present invention may be larger.

A7. Third Switch Array

In this embodiment of the present invention, the third switch array may include the at least Q switch units arranged in a one-dimensional or two-dimensional manner. Each output port in the foregoing Q output ports is corresponding to the at least one of the at least Q switch units. For example, when the at least Q output ports are Q output ports, the at least Q switch units are in a one-to-one correspondence with the Q output ports used for wavelength dropping. The at least Q switch units are configured to process local optical drop beams. As described above, each of the at least Q switch units can receive one or more sub-beams routed by the M rows of switch units in the second switch array. The sub-beams may be from different dimensions. Each of the at least Q switch units may be configured to: select one target sub-beam from the received one or more sub-beams, use the target sub-beam as an output beam of an optical drop output port corresponding to the switch unit, and route the target sub-beam to the corresponding output port. For example, each of the at least Q switch units may be set to have M beam angle deflection states. Each beam angle deflection state is corresponding to one row in the J rows of switch units in the second switch array, and the at least Q switch units may determine to select sub-beams of a beam in a specific dimension according to a changed beam angle deflection state.

By way of example, and not limitation, the switch array in this embodiment of the present invention (such as the first switch array, the second switch array, or the third switch array) may be one or more of micro-electro-mechanical systems MEMS, an LCOS, or a planar waveguide switch array.

For example, in this embodiment of the present invention, the switch array may be implemented by using a micro-electro-mechanical systems (MEMS) technology. The MEMS technology is to highly integrate a control circuit and a micro-electro-mechanical apparatus whose geometric dimension or operating dimension is at a micrometer, sub-micron or even nanometer level into extremely small space on a silicon-based or non-silicon-based material, to constitute a mechatronic device or system. In the switch array implemented by using the MEMS technology, an electrostatic force or another control force is used to enable a micro reflector to perform mechanical movement, so that a beam that is cast on the micro reflector is deflected to any direction. When the MEMS technology is used to implement the switch array in the present invention, a controller may control a micromechanical structure by using a control instruction, to drive a light modulator (a microlens) to rotate, to implement deflection of an optical path, thereby implementing dimension (in other words, a transmission path) switching.

For another example, in this embodiment of the present invention, the switch array may be implemented by using a liquid crystal on silicon (LCOS) technology. The LCOS technology achieves an objective of splitting beams by adjusting reflection angles of the beams of different wavelengths by using a liquid crystal grating principle. Because no moving part is used, the LCOS technology is pretty reliable. In the LCOS technology, a refractive index change of a liquid crystal unit is controlled to implement a reflective angle change, so that expansion and upgrade can be easily implemented. Different paths are corresponding to different areas in a spatial light modulator (liquid crystal) array, and a phase of a light spot is adjusted, to change a transmission direction of a beam, thereby switching between different ports and adjusting attenuation.

For another example, in this embodiment of the present invention, the switch array may be implemented by using a liquid crystal (LC) technology. In the switch array implemented by using the LC technology, an incident beam is split into beams in two polarization states after passing through a birefringent crystal. After one of the beams passes through a half-wave plate, the two beams are in a same polarization state, and then are cast on the switch array (a liquid crystal module). An arrangement structure of the liquid crystal is changed (from a perspective of changing molecules in the crystal) by adjusting a voltage of the birefringent crystal, so that a refractive index of the crystal changes, and a light source outputs light at different angles. There may be two to-be-selected directions in which a light passes through each layer of the liquid crystal, and after the light passes through a plurality of liquid crystal layers, there may be a plurality of optical paths that can be selected by the light.

For another example, in this embodiment of the present invention, the switch array may be implemented by using a digital light processing (DLP) technology. An internal structure of the switch array implemented by using the DLP technology is similar to an internal structure of the light modulator implemented by using the MEMS technology, and light energy is switched by deflecting the microlens. A difference is that a rotation angle of a DLP micromirror has only a few states, and this imposes a limitation on a quantity of output ports.

A8. Output Component

In this embodiment of the present invention, the output component may include the N dimensional output ports used for dimensional output. Optionally, the output component may include Q optical drop output ports used for optical drop output. In addition, the N dimensional output ports are configured to send beams in N dimensions. The beams may need to be sent to a foreign communications node (for example, a next-hop communications node in a communication link). The Q optical drop output ports are configured to output local optical drop beams.

Herein, the "optical drop beam" is a downlink beam that is in an optical network node and that needs to be sent to a local node, and the downlink beam may be a sub-beam of a beam from a foreign communications node, that is, a sub-beam of a beam from each dimension.

Optionally, in this embodiment of the present invention, the output component may further include an output optical fiber array and an output port collimator array.

The output optical fiber array may include N+Q output fibers arranged in a one-dimensional or two-dimensional manner, where N output fibers are configured to send output beams in all dimensions, and remaining Q output fibers are configured to send all optical drop beams.

The output port collimator array may include N collimators arranged in a one-dimensional or two-dimensional manner, where the N collimators are corresponding to the N output ports, and are configured to convert, into collimated beams, beams that are to be output at the N output ports. The N+Q collimators are in a one-to-one correspondence with the N output fibers, and a collimator is configured to collimate a beam that is output from a corresponding output fiber, in other words, converting, into a collimated beam, a beam that is output from the output fiber, to facilitate outputting beams to the output ports.

Optionally, the output port collimator array may further include Q collimators arranged in a one-dimensional or two-dimensional manner, where the Q collimators are corresponding to the Q ports used for wavelength dropping, and convert, into collimated beams, beams that are to be output at the Q output ports.

The components and the functions of the reconfigurable optical add/drop multiplexer in this embodiment of the present invention are described above. Configuration of the components in the reconfigurable optical add/drop multiplexer in this embodiment of the present invention, in other words, an optical path design, is described below by using examples.

Figure 4A:
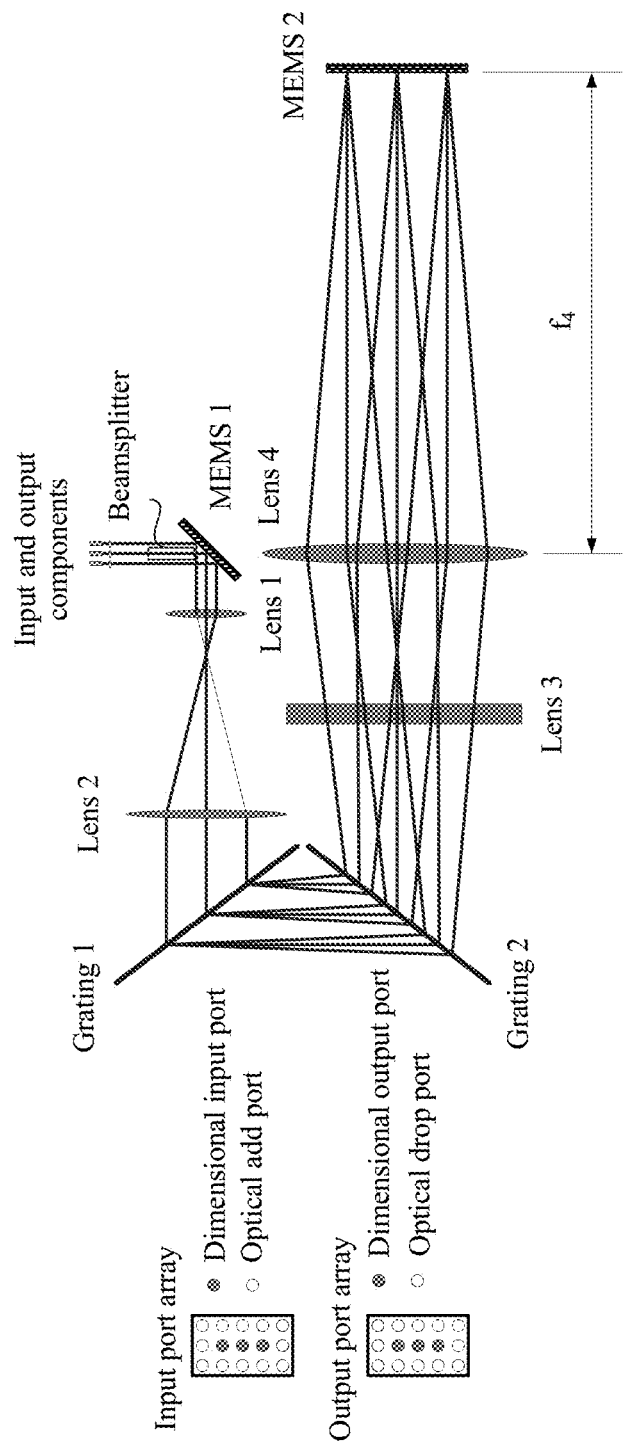
FIG. 4A is a schematic diagram of a reconfigurable optical add/drop multiplexer in a sub-wavelength extension plane direction according to still another embodiment of the present invention.
Figure 4B:
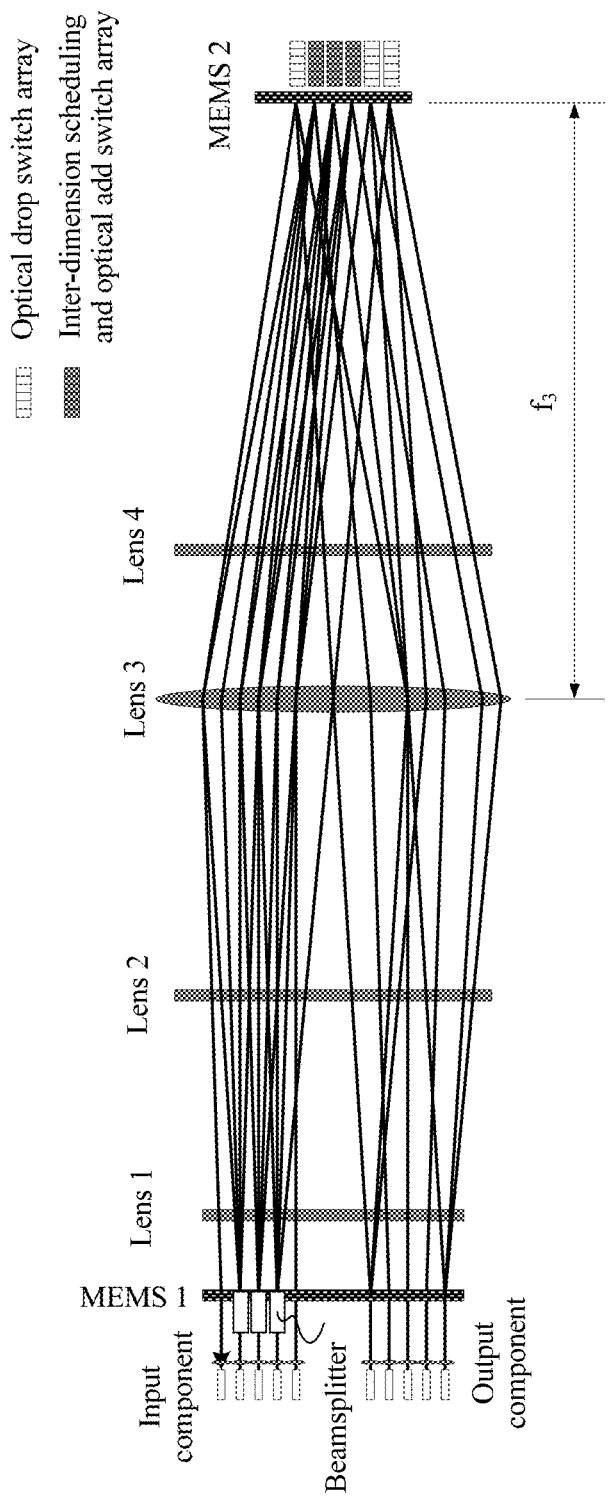
FIG. 4B is a schematic diagram of a reconfigurable optical add/drop multiplexer in FIG. 4A in a port switching plane direction.
Figure 4C:
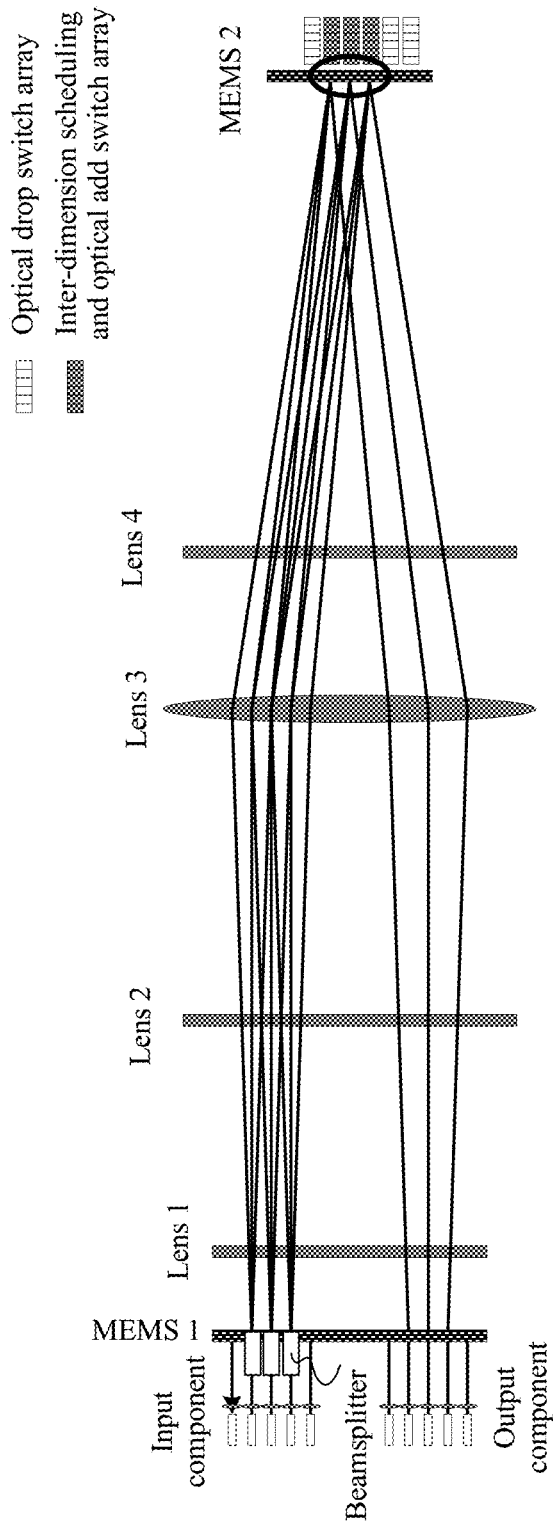
FIG. 4C is a schematic diagram of an optical path for inter-dimension switching performed by using a reconfigurable optical add/drop multiplexer in FIG. 4A.
Figure 4D:
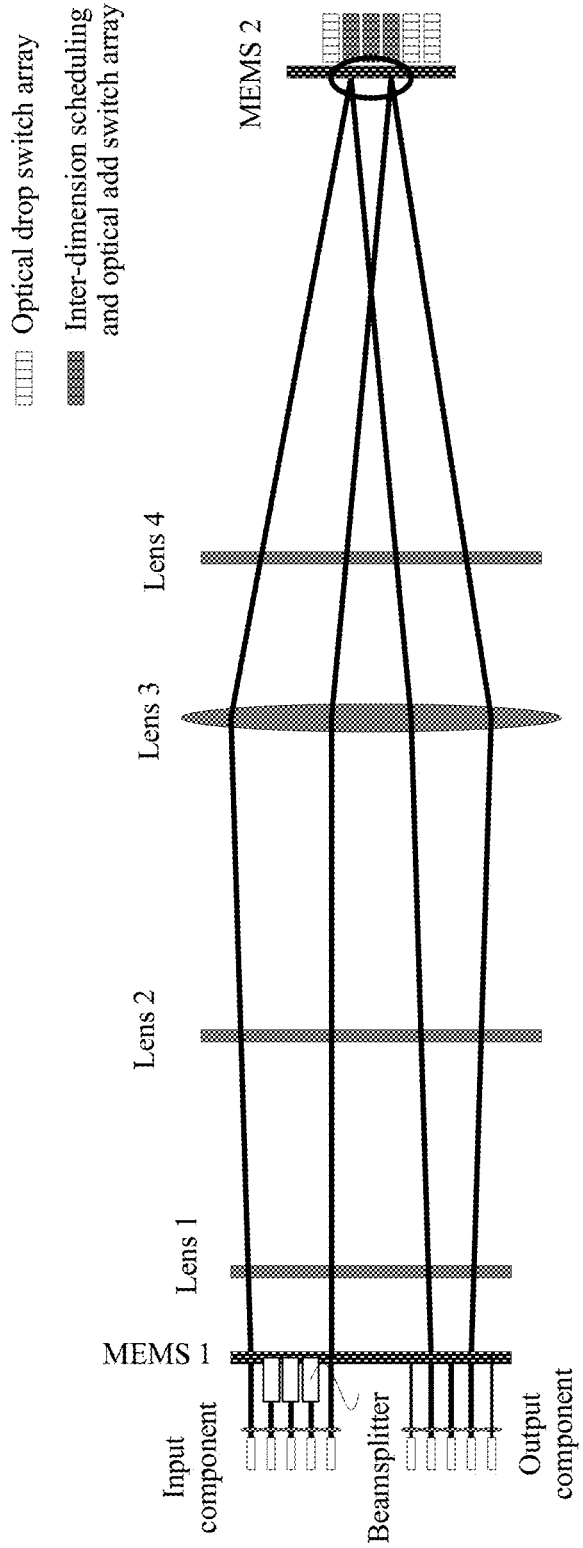
FIG. 4D is a schematic diagram of an optical path for wavelength adding performed by using a reconfigurable optical add/drop multiplexer in FIG. 4A.
Figure 4E:
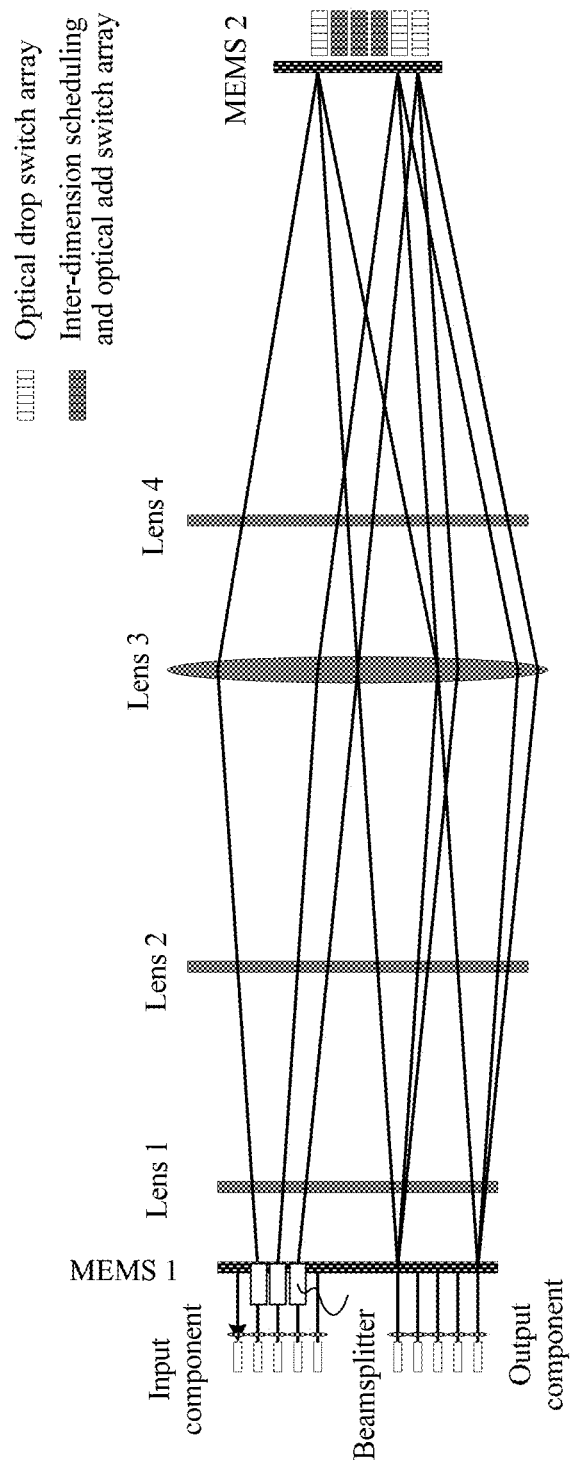
FIG. 4E is a schematic diagram of an optical path for wavelength dropping performed by using a reconfigurable optical add/drop multiplexer in FIG. 4A.

FIG. 4A to FIG. 4E show a specific embodiment of a reconfigurable optical add/drop multiplexer according to an embodiment of the present invention. FIG. 4A is a schematic diagram of a reconfigurable optical add/drop multiplexer in a wavelength extension plane direction (a top view), and FIG. 4B is a schematic diagram of the reconfigurable optical add/drop multiplexer in a port switching plane direction (a side view). FIG. 4C is a schematic diagram of an optical path for inter-dimension switching performed by using the reconfigurable optical add/drop multiplexer according to this embodiment of the present invention. FIG. 4D is a schematic diagram of an optical path for wavelength adding performed by using the reconfigurable optical add/drop multiplexer according to this embodiment of the present invention. FIG. 4E is a schematic diagram of an optical path for wavelength dropping performed by using the reconfigurable optical add/drop multiplexer according to this embodiment of the present invention.

As shown in FIG. 4A to FIG. 4E, the foregoing first switch array and third switch array may be implemented by using MEMS 1, and the foregoing second switch array may be implemented by using MEMS 2. The foregoing wavelength dispersion system may include a grating 1 and a grating 2. The foregoing redirection system may include a lens 3 and a lens 4. A lens 1 and a lens 2 are used for light spot beam expansion. An input end includes an input optical fiber array and an input port collimator array, and an output end includes an output optical fiber array and an output port collimator array. As shown in FIG. 4A, the input end includes 3×5 input ports, including three dimensional input ports and 12 optical add input ports. The output end includes 3×5 output ports, including three dimensional output ports and 12 optical drop input ports.

As shown in FIG. 4B, specifically, the MEMS 1 can process routing on optical add input beams, so that beams whose targets are a same output port emerge at a same angle. A beamsplitter makes four copies of each input beam from each dimension, to obtain 3×4 beams. In addition, as shown in FIG. 4C, 3×3 beams are routed to three rows of switch units (which are equivalent to the N rows of switch units in the foregoing second switch array) that are in the MEMS 2 and that are used for inter-dimension switching and wavelength dropping, and the three rows of switch units used for inter-dimension switching and wavelength dropping are in a one-to-one correspondence with three dimensional output ports. As shown in FIG. 4D, remaining 3×1 beams are routed to three rows of switch units (which are equivalent to the J rows of switch units in the foregoing second switch array) that are in the MEMS 2 and that are used for wavelength adding, and the three rows of switch units used for wavelength adding are in a one-to-one correspondence with three dimensional input ports. In addition, the beamsplitter may process angles of emergence of the 3×4 beams, so that beams that are in the 3×4 beams and whose targets are a same output port emerge at a same angle in the port switching plane direction.

The grating 1 and the grating 2 may be arranged to disperse each beam in the 3×4 dimensionally input beams and 12 optical add input beams into a plurality of sub-beams of different center wavelengths.

The lens 1 and the lens 2 may be configured to perform light spot beam expansion on input beams. The lens 3 (which is equivalent to the foregoing second redirection subsystem and third redirection subsystem) may be configured to perform optical path switching on the dimensionally input beams and the optical add beams, so that beams that emerge at a same angle on the port switching plane from the MEMS 1 enter a same location in the MEMS 2, in other words, are transmitted to a same row of switch units in the MEMS 2. The lens 4 (which is equivalent to the foregoing first redirection subsystem) may be configured to perform optical path switching on the dimensionally input beams and the optical add beams, so that sub-beams that are in the dimensionally input beams and the optical add beams and that have same wavelengths are transmitted on a sub-wavelength extension plane to a same location in the MEMS 2, in other words, are transmitted to a same column of switch units in the MEMS 2. Therefore, the MEMS 1, the MEMS 2, the lens 3, and the lens 4 are arranged so that any sub-beam of the 12 optical add input beams can be routed to any of the three dimensional output ports. The beamsplitter, the MEMS 2, the lens 3, and the lens 4 are arranged so that any sub-beam of input beams of the three dimensional input ports and the 12 optical add input ports can be routed to any of the three dimensional output ports. Locations of the components in the reconfigurable optical add/drop multiplexer in this embodiment of the present invention are not specifically limited, provided that corresponding functions can be implemented. For example, as shown in FIG. 4A and FIG. 4B, the MEMS 2 may be located on a focal plane of the lens 3 and the lens 4.

As shown in FIG. 4C, the MEMS 2 include three rows of switch units (which are equivalent to the foregoing N rows of switch units) used for inter-dimension switching and wavelength adding. For ease of description, the three rows of switch units may be referred to as inter-dimension scheduling and optical add switch units. The MEMS 2 further include three rows of switch units (which are equivalent to the foregoing J rows of switch units) used for wavelength dropping. For ease of description, the three rows of switch units may be referred to as optical drop switch units. The three rows of inter-dimension scheduling and optical add switch units are configured to receive sub-beams of the foregoing 3×3 beams from all the dimensions and sub-beams of 12 beams from all optical add ports. Each inter-dimension scheduling and optical add switch unit in each of the three rows of inter-dimension scheduling and optical add switch units processes a sub-beam that has a wavelength corresponding to the inter-dimension scheduling and optical add switch unit. Each switch unit in the three rows of inter-dimension scheduling and optical add switch units may receive sub-beams of input beams in three dimensions, and each inter-dimension scheduling and optical add switch unit may also receive sub-beams of an optical add beam. Each inter-dimension scheduling and optical add switch unit selects one target sub-beam from the sub-beams of the input beams in the three dimensions or the sub-beams of the optical add beam, and routes the target sub-beam to an output port corresponding to the inter-dimension scheduling and optical add switch unit. As shown in FIG. 4E, the three rows of optical drop switch units are configured to receive remaining 3×1 beams from all the dimensions, and each row of optical drop switch units is corresponding to one dimension. Each optical drop switch unit in each of the three rows of optical drop switch units is configured to transmit received sub-beams to 12 switch units (which are equivalent to the foregoing at least Q switch units in the third switch array) in the MEMS 1 according to a target optical drop port of the received sub-beams and at a specific angle.

The 12 switch units in the MEMS 1 are in a one-to-one correspondence with 12 optical drop output ports. The 12 switch units may route sub-beams of beams that are from all the dimensions and that are routed by the three rows of optical drop switch units in the MEMS 2. In addition, the MEMS 1 further include three switch units used for dimensional output. The three switch units are in a one-to-one correspondence with the three rows of inter-dimension scheduling and optical add switch units in the MEMS 2, and it is set that at specific deflection angles corresponding to the three rows of inter-dimension scheduling and optical add switch units, only sub-beams transmitted by corresponding inter-dimension scheduling and optical add switch units are allowed to pass through one of the three switch units, so as to implement dimensional output.

Figure 5A:
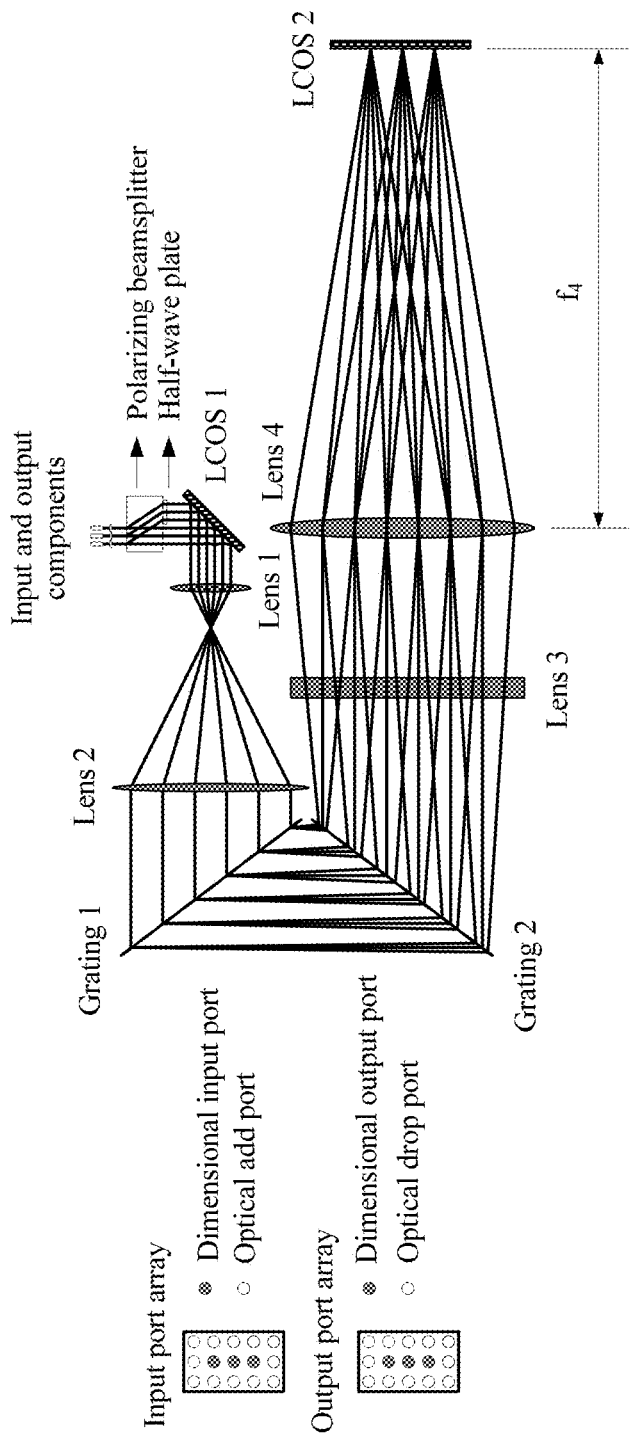
FIG. 5A is a schematic diagram of a reconfigurable optical add/drop multiplexer in a sub-wavelength extension plane direction according to still another embodiment of the present invention.
Figure 5B:
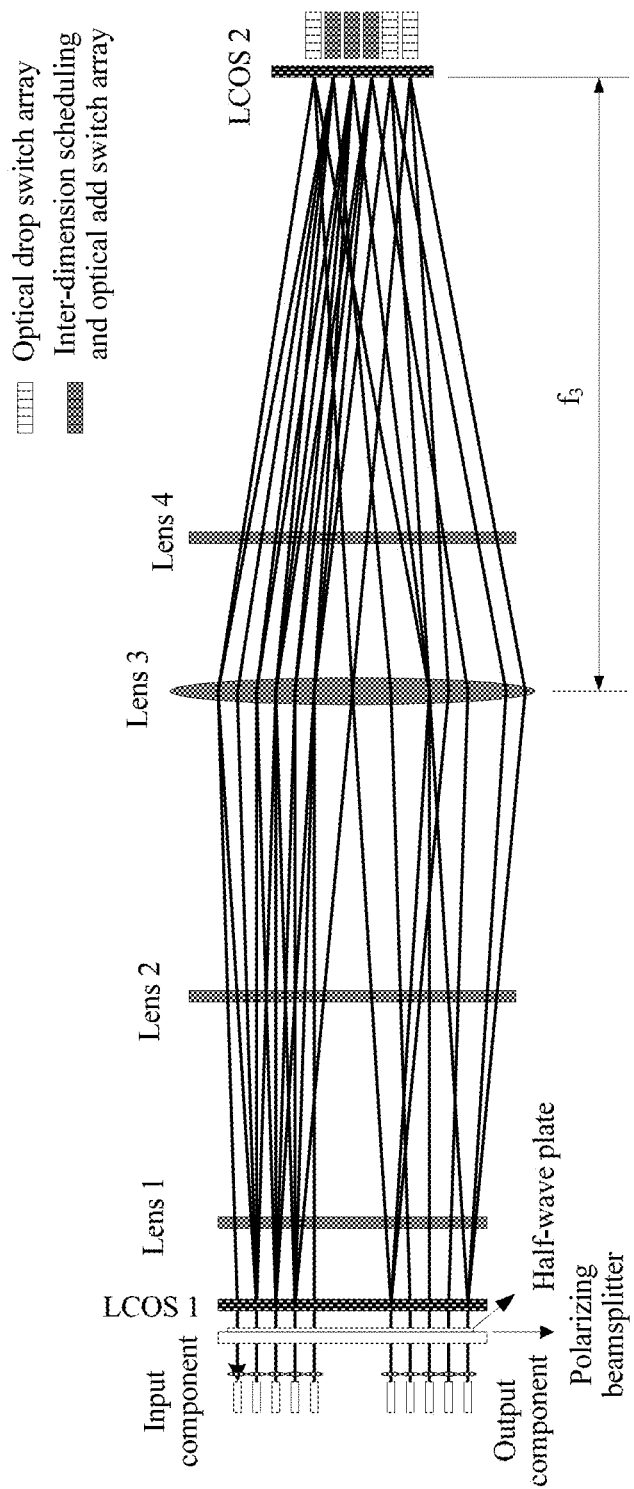
FIG. 5B is a schematic diagram of a reconfigurable optical add/drop multiplexer in FIG. 5A in a port switching plane direction.

FIG. 5A and FIG. 5B show another specific embodiment of a reconfigurable optical add/drop multiplexer according to an embodiment of the present invention. FIG. 5A is a schematic diagram of a reconfigurable optical add/drop multiplexer in a wavelength extension plane direction (a top view), and FIG. 5B is a schematic diagram of the reconfigurable optical add/drop multiplexer in a port switching plane direction (a side view).

As shown in FIG. 5A and FIG. 5B, a first switch array and a third switch array may be implemented by using an LCOS 1, and a beamsplitter may also be implemented by using the LCOS 1. A second switch array may be implemented by using an LCOS 2. Because an LCOS can process only beams in a single polarization state, a polarizing beamsplitter and a half-wave plate are further added to the reconfigurable optical add/drop multiplexer, to convert mutually orthogonal polarization beams into beams in a single polarization state, to facilitate subsequent optical path processing. The foregoing wavelength dispersion system may be implemented by using a grating 1 and a grating 2. The foregoing redirection system may include a lens 3 and a lens 4. The lens 1 and the lens 2 are used for light spot expansion. An input end includes an input optical fiber array and an input port collimator array, and an output end includes an output optical fiber array and an output port collimator array. For ease and simplicity of description, for a specific working principle and process of the reconfigurable optical add/drop multiplexer in this embodiment of the present invention, refer to corresponding processes in the foregoing method embodiment, and details are not described herein again.

In this embodiment of the present invention, the beamsplitter is disposed in the reconfigurable optical add/drop multiplexer, each of M input beams received by using M input ports is split into N+1 parts by using the beamsplitter, N parts of beams are used for inter-dimension switching, and remaining one part of beams is used for local wavelength dropping. In addition, all the components in the reconfigurable optical add/drop multiplexer are arranged so that arrangement of the first switch array, the wavelength dispersion system, the redirection system, and the second switch array can implement an optical add function, and arrangement of the beamsplitter, the wavelength dispersion system, the second switch array, and the third switch array can implement both a local optical drop function and an inter-dimension switching function. Therefore, the beamsplitter is disposed, and an optical switching function of the second switch array is repeatedly used, so that a local optical add function, the local optical drop function, and the inter-dimension switching function are implemented in a single optical system by using the three levels of switch arrays. This can improve an integration level of the reconfigurable optical add/drop multiplexer.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A reconfigurable optical add/drop multiplexer, comprising:
an input component comprising M+P input ports, wherein M input ports are used for dimensional input, P input ports are used for wavelength adding, and M and P are integers greater than or equal to 1;

an output component comprising N output ports, wherein the N output ports are used for dimensional output, and N is an integer greater than or equal to 1;

a first switch array comprising at least P switch units, wherein each of the P input ports corresponds to at least one of the at least P switch units, and the at least P switch units are configured to: receive P input beams from the P input ports, and route the P input beams;

a beamsplitter, configured to: receive M input beams from the M input ports, and split each of the M input beams into at least N parts, to obtain at least M×N beams;

a wavelength dispersion system, configured to: receive the P input beams from the first switch array, and disperse the P input beams, to obtain sub-beams of the P input beams, and further configured to: receive the at least M×N beams from the beamsplitter, and disperse the at least M×N beams, to obtain sub-beams of the at least M×N beams;

a second switch array comprising N rows of switch units, wherein each row of switch units comprise K switch units, the K switch units are in a one-to-one correspondence with K wavelengths, the K switch units are separately configured to route sub-beams of respective wavelengths of the K switch units, and K is an integer greater than 1; and a redirection system, configured to: receive the sub-beams of the P input beams from the wavelength dispersion system, and redirect the sub-beams of the P input beams to the N rows of switch units in the second switch array, wherein the N rows of switch units route the sub-beams of the P input beams to the N output ports, and the first switch array, the second switch array, the wavelength dispersion system, and the redirection system are arranged so that the sub-beams of the P input beams can be routed to the N output ports, wherein the redirection system is further configured to: receive sub-beams of M×N beams in the at least M×N beams from the wavelength dispersion system, and redirect the sub-beams of the M×N beams to the N rows of switch units in the second switch array, wherein the N rows of switch units route the sub-beams of the M×N beams to the N output ports.

2. The reconfigurable optical add/drop multiplexer according to claim 1, further comprising a third switch array comprising at least Q switch units, wherein each of at least Q output ports is corresponding to at least one of the at least Q switch units;

the input component further comprises the Q output ports, wherein the Q output ports are used for wavelength dropping, and Q is an integer greater than 1;

the at least N parts are N+1 parts, and the at least M×N beams are M×(N+1) beams;

the second switch array further comprises J rows of switch units, wherein J is an integer greater than or equal to 1 and less than or equal to M; and the redirection system is further configured to: receive, from the wavelength dispersion system, sub-beams of remaining M beams in the M×(N+1) beams except the M×N beams, and redirect the sub-beams of the M beams to the J rows of switch units in the second switch array, wherein the J rows of switch units route the sub-beams of the M beams to the at least Q switch units in the third switch array, the at least Q switch units separately output, to the corresponding Q output ports, the beams received from the J rows of switch units, and the second switch array, the third switch array, the wavelength dispersion system, and the redirection system are arranged so that the sub-beams of the M beams can be routed to the Q output ports.

3. The reconfigurable optical add/drop multiplexer according to claim 2, wherein J=M, the J rows of switch units in the second switch array are in a one-to-one correspondence with the M input ports, and each row of switch units in the J rows of switch units in the second switch array are configured to route sub-beams obtained after input beams of an input port corresponding to the row of switch units pass through the wavelength dispersion system.

4. The reconfigurable optical add/drop multiplexer according to claim 1, wherein the N rows of switch units in the second switch array are in a one-to-one correspondence with the N output ports, and each switch unit in each of the N rows of switch units in the second switch array is configured to: select one target sub-beam from a plurality of sub-beams transmitted to the switch unit, and route the target sub-beam to an output port corresponding to the row of switch units.

5. The reconfigurable optical add/drop multiplexer according to claim 1, wherein the redirection system comprises a first redirection subsystem, wherein the first redirection subsystem is configured to change beam propagation characteristics of the sub-beams of the P input beams and the sub-beams of the at least M×N beams in a sub-wavelength extension plane direction, so that sub-beams that are in the sub-beams of the P input beams and the sub-beams of the at least M×N beams and that have a same wavelength are routed in the sub-wavelength extension plane direction to a same location in the second switch array; and the redirection system further comprises a second redirection subsystem, wherein the second redirection subsystem is configured to change beam propagation characteristics of the sub-beams of the P input beams and the sub-beams of the M×N beams in a port switching plane direction, so that sub-beams that are in the sub-beams of the P input beams and the sub-beams of the M×N beams and that are corresponding to a same output port are routed in the port switching plane direction to a same location in the second switch array.

6. The reconfigurable optical add/drop multiplexer according to claim 2, wherein the redirection system comprises a second redirection subsystem, and the second redirection subsystem is configured to change beam propagation characteristics of the sub-beams of the remaining M beams in a port switching plane direction, so that sub-beams, in the sub-beams of the remaining M beams, of beams that are input from a same input port are routed in the port switching plane direction to a same location in the second switch array.

7. The reconfigurable optical add/drop multiplexer according to claim 1, wherein the beamsplitter is one of a liquid crystal on silicon (LCOS) beamsplitter, a spatial beamsplitter, or a planar waveguide beamsplitter.

8. The reconfigurable optical add/drop multiplexer according to claim 1, wherein the first switch array and the second switch array are one or more of a micro-electro-mechanical systems (MEMS) switch array, a liquid crystal on silicon (LCOS) switch array, or a planar waveguide switch array.

9. The reconfigurable optical add/drop multiplexer according to claim 1, wherein K is a maximum quantity of sub-wavelengths of wavelength division multiplexing signals that are input by using the M+P input ports.

10. The reconfigurable optical add/drop multiplexer according to claim 1, wherein the wavelength dispersion system comprises at least one grating.

11. The reconfigurable optical add/drop multiplexer according to claim 1, wherein the redirection system comprises at least one lens.

12. The reconfigurable optical add/drop multiplexer according to claim 1, further comprising:
- an input port collimator array comprising M+P collimators, wherein the M+P collimators correspond to the M+P input ports, and are configured to convert, into collimated beams, beams that are input by using the M+P input ports; and
- an output port collimator array comprising N collimators, wherein the N collimators correspond to the N output ports, and are configured to convert, into collimated beams, beams that are to be output at the N output ports.

13. The reconfigurable optical add/drop multiplexer according to claim 1, wherein the first switch array and the second switch array are implemented using liquid crystal technology, and wherein an incident beam is split into two beams in two polarization states after passing through a birefringent crystal, and the two beams cast on the switch array after one of the two beams passes through a half-wave plate.

* * * * *